(12) United States Patent
Kishikawa et al.

(10) Patent No.: US 8,718,974 B2
(45) Date of Patent: May 6, 2014

(54) MEASURING APPARATUS AND MEASURING SYSTEM

(75) Inventors: Kiyonari Kishikawa, Fukuoka (JP); Kouhei Tou, Fukuoka (JP)

(73) Assignee: Geo Technical Laboratory Co., Ltd., Fukuoka (JP)

( * ) Notice: Subject to any disclaimer, the term of this patent is extended or adjusted under 35 U.S.C. 154(b) by 433 days.

(21) Appl. No.: 13/258,681

(22) PCT Filed: Mar. 19, 2010

(86) PCT No.: PCT/JP2010/054866
§ 371 (c)(1),
(2), (4) Date: Sep. 22, 2011

(87) PCT Pub. No.: WO2010/113686
PCT Pub. Date: Oct. 7, 2010

(65) Prior Publication Data
US 2012/0016629 A1    Jan. 19, 2012

(30) Foreign Application Priority Data
Mar. 31, 2009 (JP) ................. 2009-088031

(51) Int. Cl.
*G01B 11/14* (2006.01)
*G01B 5/28* (2006.01)
*G01C 22/00* (2006.01)
*G01P 3/486* (2006.01)
*G01B 11/275* (2006.01)

(52) U.S. Cl.
CPC ............. *G01C 22/00* (2013.01); *G01P 3/486* (2013.01); *G01B 11/275* (2013.01)
USPC ............ 702/163; 33/203.18; 73/514.04; 702/94; 702/158

(58) Field of Classification Search
CPC ......... G01C 22/00; G01P 3/486; G01P 1/003; G01P 13/04; G01B 11/2755; G01B 11/275; G01B 2210/14; G01B 2210/30
USPC .................. 702/94, 150, 155, 157, 158, 163; 33/203.18; 73/462, 514.04; 356/138, 356/141.1; 384/448; 701/31.4
See application file for complete search history.

(56) References Cited

U.S. PATENT DOCUMENTS 4,077,266 A * 3/1978 Takamatsu et al. ......... 73/514.04
8,561,307 B2 * 10/2013 Stieff et al. ................ 33/203.18

FOREIGN PATENT DOCUMENTS

JP     1-153909    6/1989
JP     5-23775     3/1993
(Continued)

OTHER PUBLICATIONS

International Search Report issued Jun. 15, 2010 in corresponding International Application No. PCT/JP2010/054866.

*Primary Examiner* — John H Le
(74) *Attorney, Agent, or Firm* — Wenderoth, Lind & Ponack, L.L.P.

(57) ABSTRACT

Measuring devices each include a rotating body arranged between a wheel and a wheel hub with rotation centers aligned with each other, and an optical detector fixed to a body frame. The rotating body is formed of a disk portion attached between the wheel and a mounting surface of the wheel hub, and a cylindrical portion extending from the disk portion to the body frame and encompassing an outer circumferential surface of the wheel hub. In a circumferential surface of the cylindrical portion, there are provided elongate holes as light-transmitting portions that transmit light therethrough. The optical detector includes a light-emitting element serving as a light-emitting portion and a light-receiving element serving as a light-receiving portion, which are fixed to the body frame by a mounting bracket.

10 Claims, 5 Drawing Sheets

(56) References Cited

FOREIGN PATENT DOCUMENTS

| | | |
|---|---:|---:|
| JP | 6-67723 | 3/1994 |
| JP | 6-61629 | 8/1994 |
| JP | 10-311844 | 11/1998 |
| JP | 2000-137039 | 5/2000 |
| JP | 2002-264785 | 9/2002 |

* cited by examiner $d_1 = 2\pi r_1 \times (\theta/2\pi)$
$d_2 = 2\pi r_2 \times (\theta/2\pi)$
$\theta = (d_1 - d_2) / (r_1 - r_2)$
$\theta = D/L$ D: DIFFERENCE IN DISTANCE BETWEEN RIGHT AND LEFT REAR WHEELS
L: TREAD WIDTH OF VEHICLE REAR WHEELS

MEASURING APPARATUS AND MEASURING SYSTEM

CROSS-REFERENCE TO RELATED APPLICATION

The present application is based on International Application No. PCT/JP2010/054866 which was filed on Mar. 19, 2010 in Japan and claims priority under 35 U.S.C. §119 from Japanese Patent Application No. 2009-088031 which was filed on Mar. 31, 2009.

BACKGROUND OF THE INVENTION

1. Field of the Invention

The present invention relates to a measuring apparatus and a measuring system attached to a vehicle to measure a distance between points and a traveling speed.

2. Description of the Related Art

For example, for creation of an electronic map, a map book and the like, a measuring vehicle called a probe car that photographs geography and buildings, and measures a distance actually travels along roads to collect data. When the measuring vehicle measures a distance between points, a rotary encoder mounted on the outer side of a wheel of the measuring vehicle is used as a conventional measuring apparatus. This rotary encoder incorporates, in a box-like housing, a disk with slits opened at predetermined intervals along a circumferential direction, and a photo interrupter that senses rotation of the slits. This conventional measuring apparatus is mounted by attaching a rotary shaft for rotating the disk to an external center portion of the wheel, and holding the housing by a support which straddles a tire house opened in a fender of a body.

As the rotary encoder, a rotary encoder described in Japanese Utility Model Application Publication No. 5-23775 is known. A rotating device described in the Publication is formed into a cup shape, a rotating member pivotally supported by a rotary shaft of a motor is arranged so as to cover the motor, and another portion of rotation detecting means attached to the rotary member is provided on an inner wall of a container so as to be opposed to a portion of the rotation detecting means. In the rotating device described in the Publication, it is described that the portion of the rotation detecting means is provided as a slit plate, and the other portion configures a photo interrupter made up of a light-emitting element and a light-receiving element, or that the portion of the rotation detecting means is provided as a magnetic signal magnetizing drum with N and S poles alternately arranged, and the other portion is provided as a magnetoresistance element made of permalloy whose resistance varies in accordance with variation in magnetic flux.

However, in the conventional measuring apparatus, the apparatus itself is mounted on the outer side of the wheel, thereby increasing a vehicle width, which may disable the vehicle to enter a narrow path that the vehicle itself could enter. Particularly in a case where the conventional measuring apparatuses are provided on both wheels in order to increase measurement accuracy, the vehicle width further increases.

Moreover, since the rotary shaft of the rotary encoder incorporated in this housing is mounted on the wheel while the housing is mounted on and fixed to the body of the vehicle, in the vehicle in which a shock absorber is arranged obliquely to a car body frame for supporting a wheel hub, the wheel moves up and down in an inclined state in accordance with bumps of a road surface, resulting in that the wheel moves elliptically. Accordingly, in the conventional measuring apparatus, a distance between points and a traveling speed cannot be measured with high accuracy.

Moreover, in the conventional measuring apparatus, since magnetic detection is performed, vibration of the vehicle may also be detected as the rotation of the rotating member, which also makes it difficult to detect the distance between points and the traveling speed with high accuracy.

Consequently, an object of the present invention is to provide a measuring apparatus and a measuring system capable of measuring a distance between points and the like with high accuracy even on a narrow path that a vehicle can enter, and even if there are bumps on a road surface.

SUMMARY OF THE INVENTION

A measuring apparatus according to the present invention includes: a rotating body that is provided with an optically sensed portion, and is arranged between a wheel for supporting a tire and a wheel hub for mounting the wheel on a body frame of a vehicle with rotation centers aligned with each other; and an optical detector that is fixed to the body frame, and detects variation in position of the optically sensed portion accompanying rotation of the rotating body.

According to the measuring apparatus of the present invention, since the rotating body is arranged between the wheel for supporting the tire and the wheel hub for mounting the wheel on the body frame of the vehicle with the rotation centers aligned with each other, the measuring apparatus does not bulge outward from the wheel. Accordingly, attachment of the measuring apparatus of the present invention to the vehicle does not largely increase a vehicle width. Moreover, since the optical detector that detects the variation in position of the optically sensed portion accompanying the rotation of the rotating body is fixed to the body frame, even if the rotating body swings in accordance with bumps of a road surface, the optical detector also swings accompanying the rotating body, and thus, the measurement can be performed without any influence even if a shock absorber is arranged obliquely to the body frame.

Preferably, the rotating body is formed of a disk portion attached between the wheel and a mounting surface of the wheel hub, and a cylindrical portion that extends from the disk portion to the body frame and encompasses an outer circumferential surface of the wheel hub, the optically sensed portion is provided along a circumferential surface of the cylindrical portion, and the optical detector is mounted on the body frame via a mounting bracket.

Since the optical detector is adapted to detect the optically sensed portion provided along the circumferential surface of the cylindrical portion that extends from the disk portion to the body frame and encompasses the outer circumferential surface of the wheel hub, the optical detector can be set up at a position with a short distance from the body frame. Accordingly, since the mounting bracket for support the optical detector may not be a member having a long length, a situation can be prevented where a measurement error occurs or the optical detector hits the rotating body when the optical detector largely swings due to vibration.

Preferably, the optically sensed portion is a light-transmitting portion that transmits light, and the optical detector is made of a light-emitting portion that emits light toward the light-transmitting portion, and a light-receiving portion that receives the transmitted light passing through the light-transmitting portion, which are opposed to each other with the light-transmitting portion interposed therebetween.

Since the light-emitting portion and the light-receiving portion included in the optical detector are opposed with the light-transmitting portion serving as the optically sensed portion interposed therebetween to configure a rotary encoder using a transmissive photo interrupter, detection of the vibration of the vehicle as rotation of the rotating body can be reduced, and thus, more accurate measurement is enabled.

Preferably, the optically sensed portion is a light-reflecting portion that reflects light, and the optical detector is made of a light-emitting portion that emits light toward the light-reflecting portion, and a light-receiving portion that receives the reflected light from the light-reflecting portion.

Since the light-emitting portion and the light-receiving portion included in the optical detector can configure a rotary encoder using a reflective photo interrupter (photo reflector) that detects light reflected at the light-reflecting portion serving as the optically sensed portion, detection of the vibration of the vehicle as rotation of the rotating body can be reduced, and thus, more accurate measurement is enabled.

The measuring apparatus may be designed to include a plurality of the optically sensed portion along the circumferential surface of the cylindrical portion such that they are equally spaced away from adjacent ones.

In a measuring system according to the present invention, the measuring apparatus according to the present invention is arranged in each of right and left wheels of at least any one of front wheels and rear wheels of the vehicle, the measuring system including: traveling-distance calculating means for calculating a traveling distance of each of the tires, based on a sensing signal outputted from the optical detector and circumference data of the tire; and angle-variation amount estimating means for estimating an angle variation amount in a traveling direction of the vehicle, based on a difference in the traveling distances of the right and left tires, and a distance between the right and left tires.

According to the measuring system of the present invention, since the measuring apparatus of the present invention is arranged in each of the right and left wheels of at least any one of the front wheels and the rear wheels of the vehicle, and the measuring apparatus of the present invention does not bulge outward from the wheel, the vehicle width is not largely increased. Moreover, since the traveling-distance calculating means calculates the traveling distance of each of the tires based on the sensing signal outputted from the optical detector and the circumference data of the tire, and the angle-variation amount estimating means estimates the angle variation amount in the traveling direction of the vehicle based on the difference in traveling distance between the right and left tires and the distance between the right and left tires. It is thus possible to obtain the data in which the traveling distances of the tires and the variation in the traveling direction in accordance with the distances match each other. Accordingly, the measuring system of the present invention can accurately obtain a traveling trace of the vehicle.

There are preferably provided: angle detecting means for detecting angle variation in the traveling direction of the vehicle to output as angle data; angle-variation amount calculating means for calculating an angle variation amount based on the angle data; and traveling-state determining means for comparing the angle variation amount calculated by the angle-variation amount calculating means with the angle variation amount estimated by the angle-variation amount estimating means to determine a traveling state of the vehicle. The traveling-state determining means compares the angle variation amount of the vehicle calculated by the angle-variation amount calculating means with the angle variation amount in the traveling direction of the vehicle estimated by the angle-variation amount estimating means. When these variation amounts are largely different from each other, it can be detected that the measurement state is abnormal. Accordingly, the traveling state of the vehicle can be determined.

According to the present invention, since the measuring apparatus can be attached to the vehicle without bulging outward from the wheel, and measurement can be performed without any influence even in a case where the shock absorber is arranged obliquely to the body frame. Therefore, a distance between points and the like can be measured with high accuracy even on a narrow path that the vehicle can enter and even if the road surface has bumps.

The above and other objects and advantageous features of the present invention will be made apparent from the following description made with reference to the accompanying drawings, in which like reference characters designate the same or similar parts throughout the drawings.

DESCRIPTION OF THE EXEMPLARY EMBODIMENTS

A measuring apparatus and a measuring system using this measuring apparatus according to an embodiment of the present invention are described with reference to the drawings.

(Configuration of Measuring System)

Figure 1:
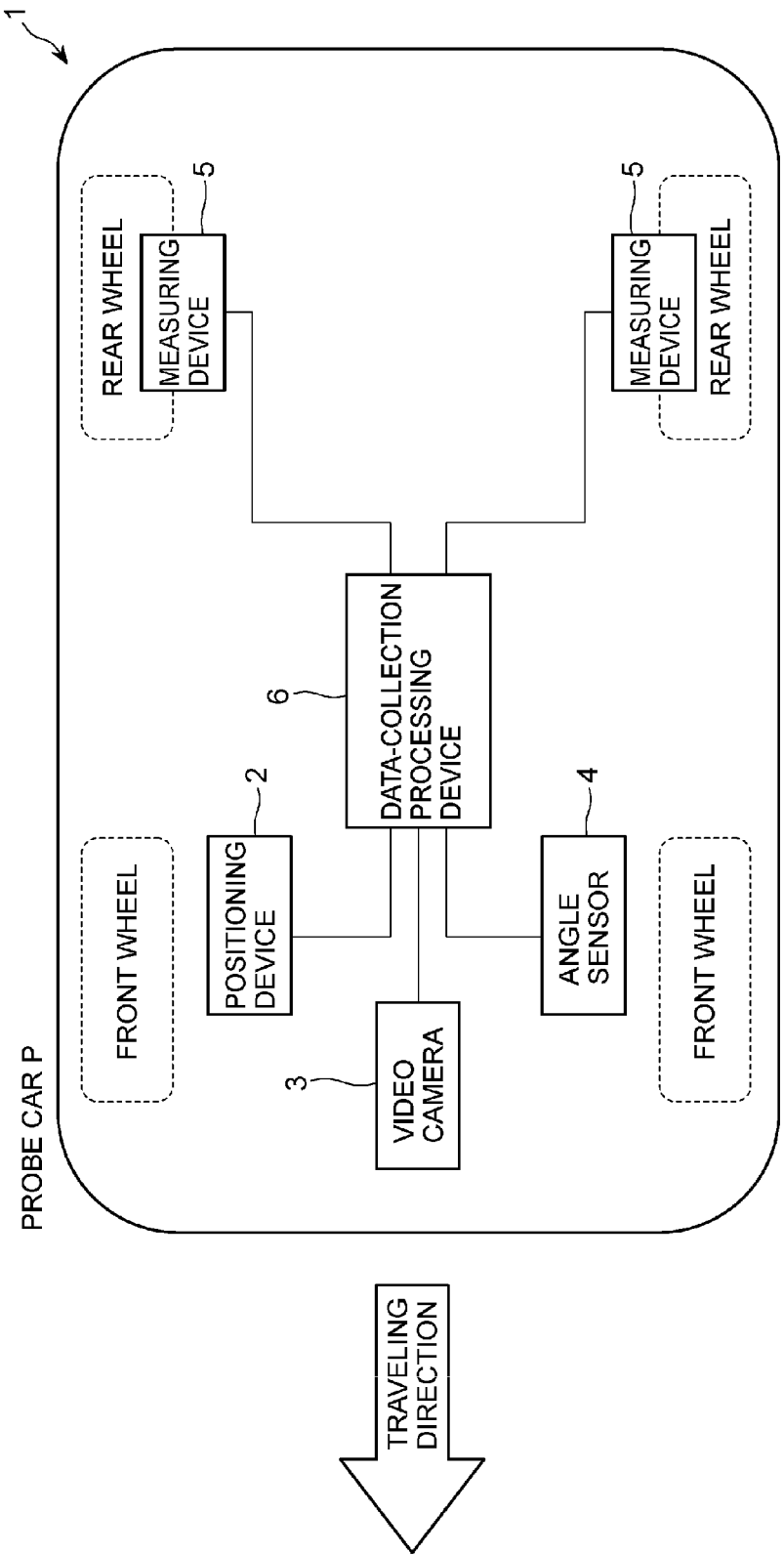
FIG. 1 is a diagram showing a configuration of an overall measuring system according to an embodiment of the present invention.

A measuring system 1 shown in FIG. 1 is, for example, carried by a probe car P that travels along a road to photograph geography and buildings and to collect acquired images in association with information of photographing points. The collected data is utilized for creation of an electronic map, a map book and the like. The measuring system 1 includes a positioning device 2, a video camera 3, an angle sensor 4, two measuring devices 5, and a data-collection processing device 6.

For the positioning device 2, a global positioning system (GPS), a satellite positioning system (Galileo) or the like can be employed, and it outputs longitude data and latitude data as position data indicating a position of the probe car P to the data-collection processing device 6.

The video camera 3 photographs scenery in a traveling direction from a car interior at predetermined time intervals and outputs photographed data to the data-collection processing device 6. The angle sensor 4 is a gyro sensor serving as angle detection means for detecting angle variation in a direction in which the vehicle is currently traveling with a direction at the time of starting measurement set as a reference direction and outputting the angle variation as angle data.

The measuring devices 5 are provided in both rear wheels. A configuration of the measuring devices 5 is described below in detail with reference to FIG. 2.

(Configuration of Measuring Devices)

Each of the measuring devices 5 is arranged between a wheel W supporting a tire T and a wheel hub WH for mounting the wheel W on a body frame F of the probe car P with rotation centers aligned with each other, and includes a rotating body 51 that rotates together with the rear wheel, and an optical detector 52 that detects variation accompanying rotation of the rotating body 51. This measuring device 5 outputs a sensing signal indicating a rotation amount of the rotating body 51 to the data-collection processing device 6.

The rotating body 51 is formed of a disk portion 511 attached between the wheel W and a mounting surface of the wheel hub WH, and a cylindrical portion 512 that extends from the disk portion 511 to the body frame F and encompasses an outer circumferential surface of the wheel hub WH. The rotating body 51 is fixed by nuts N in a state where four hub bolts HB projected from the wheel hub WH are inserted through through-holes 511a provided in the disk portion 511 and the wheel W is interposed therebetween. In this cylindrical portion 512, optically sensed portions are provided to detect rotation of the cylindrical portion 512 by the optical detector 52. In the present embodiment, as the optically sensed portions, long holes 513 serving as light-transmitting portions that transmit light are provided at predetermined intervals along a circumferential surface of the cylindrical portion 512. In the present embodiment, the long holes 513 are provided at intervals of 15 degrees around an axis line of the cylindrical portion 512.

The optical detector 52 includes a light-emitting element 521 serving as a light-emitting portion and a light-receiving element 522 serving as a light-receiving portion. For the light-emitting element 521, a light-emitting diode can be used. For the light-receiving element 522, a phototransistor can be used. The light-emitting element 521 and the light-receiving element 522 are mounted on the body frame F in an opposed state through a mounting bracket 523 to configure a photo interrupter. The mounting bracket 523 is formed of L-shaped brackets 523a with the light-emitting element 521 and the light-receiving element 522 arranged at terminal portions thereof respectively, and a mounting plate 523b that fixes these L-shaped brackets 523a in an opposed state to fix to the body frame F. The light-receiving element 522 outputs a sensing signal to the data-collection processing device 6, based on light from the light-emitting element 521 that passes through the long holes 513.

Figure 3:
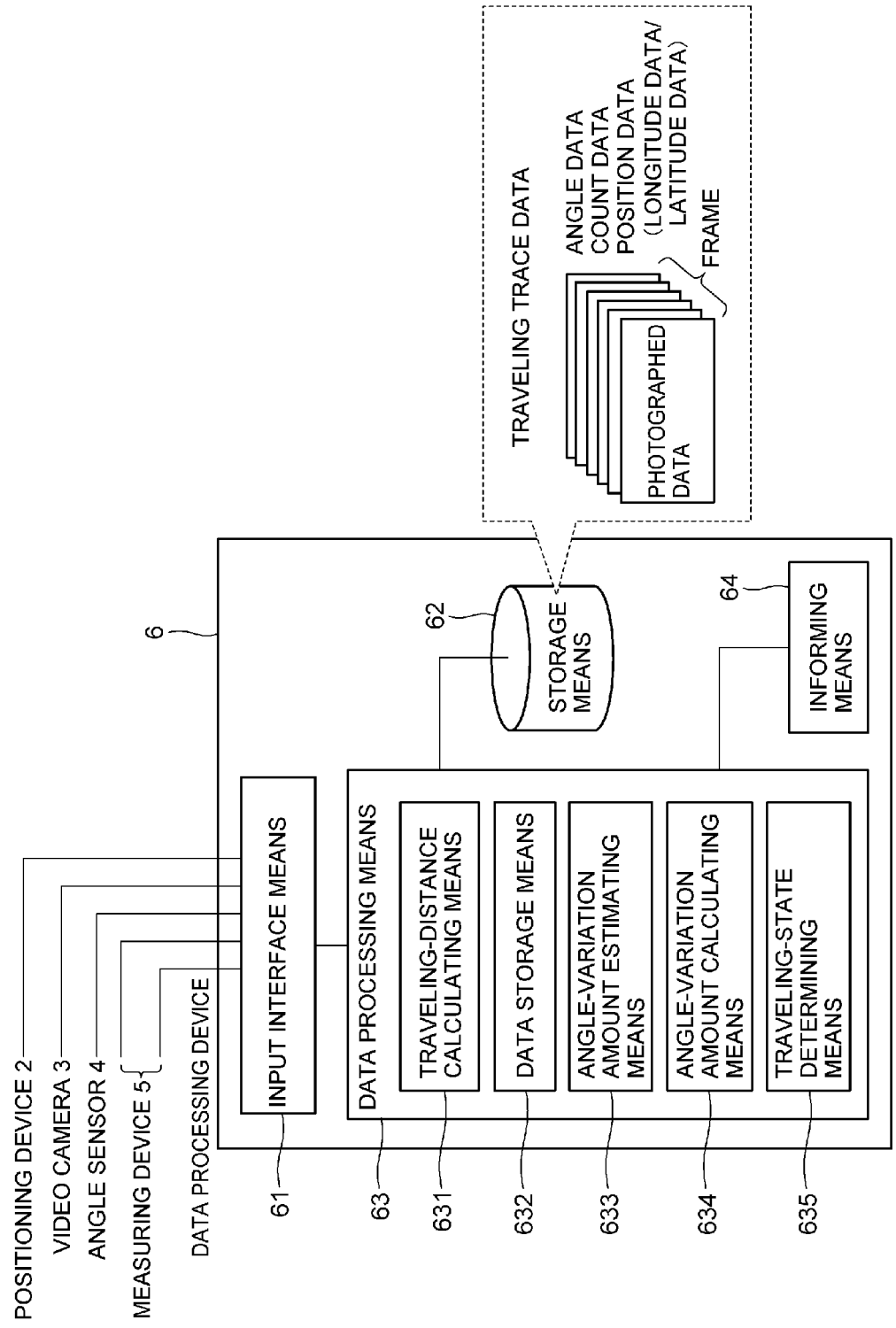
FIG. 3 is a block diagram showing a configuration of the measuring apparatus used in the measuring system shown in FIG. 1.

The data-collection processing device 6 calculates an accurate traveling trace by arithmetic operation from various types of information obtained by driving the probe car P, and records the same together with photographed data. This data-collection processing device 6 is set up in an interior of the probe car P. A configuration of the data-collection processing device 6 is described below in detail with reference to FIG. 3.

(Configuration of Data-Collection Processing Device)

The data-collection processing device 6 includes input interface means 61 connected through cables to the positioning device 2, the video camera 3, the angle sensor 4, and the measuring devices 5, respectively, storage means 62 on which inputted various types of data are recorded, data processing means 63 that records the inputted various types of data on the storage means 62 and performs arithmetic operation for obtaining a traveling trace based on inputted data, and informing means 64.

The input interface means 61 inputs the position data from the positioning device 2, the photographed data from the video camera 3, the angle data from the angle sensor 4, and the sensing signals from the measuring devices 5.

The storage means 62 is a high-capacity nonvolatile memory on which the various types of data are recorded, and a hard disk drive can be used such storage means 62.

The data processing means 63 includes traveling-distance calculating means 631, data storage means 632, angle-variation amount estimating means 633, angle-variation amount calculating means 634, and traveling-state determining means 635.

The traveling-distance calculating means 631 counts the sensing signals outputted from the two measuring devices 5 respectively, and outputs, as count data, a cumulative total indicating how many times the long holes 513 of the rotating body 51 pass by the optical detector 52 from the start of measurement to the present. Moreover, the traveling-distance calculating means 631 calculates the traveling distances of the respective rear wheels as distance data, based on the count data from a reference point to a current point, and circumference data indicating a length of a circumference of the tire set in advance.

The data storage means 632 stores, in the storage means 62, as traveling-trace data, the count data calculated by the traveling-distance calculating means 631, the position data from the positioning device 2, and the angle data from the angle sensor 4 in association with respective frames of the photographed data from the video camera 3.

The angle-variation amount estimating means 633 estimates an angle variation amount in the traveling direction of the probe car P, based on a difference in traveling distance between the right and left tires and a tread width of the rear wheels indicating a distance between the right and left tires, which is set in advance.

The angle-variation amount calculating means 634 calculates an angle variation amount of the probe car P from a difference between the angle data from the angle sensor 4 at the reference point and the angle data at the current point.

The traveling-state determining means 635 compares the angle variation amount calculated by the angle-variation amount calculating means 634 and the angle variation amount estimated by the angle-variation amount estimating means 633 to determine a traveling state of the probe car P.

The informing means 64 informs a measurer of abnormity of the angle sensor 4 or the measuring devices 5, 5, and when the operator is informed by sound, such sound can be a buzzer, a chime or the like. Moreover, when the operator is informed by display, the informing means 64 can be a display screen for displaying a message informing that there occurs abnormity.

(Operation and Use State of Measuring System)

Operation of the measuring system 1 according to the embodiment of the present invention configured as described above and a use state thereof are described with reference to the drawings.

As shown in FIG. 1, the probe car P is driven to put the data-collection processing device 6 into an operable state. The video camera 3 outputs scenery through a windshield as photographed data from a time point when the photographing starts. The position data is outputted from the positioning device 2, and the angle data corresponding to the angle variation in the traveling direction of the vehicle is outputted from the angle sensor 4.

Figure 2:
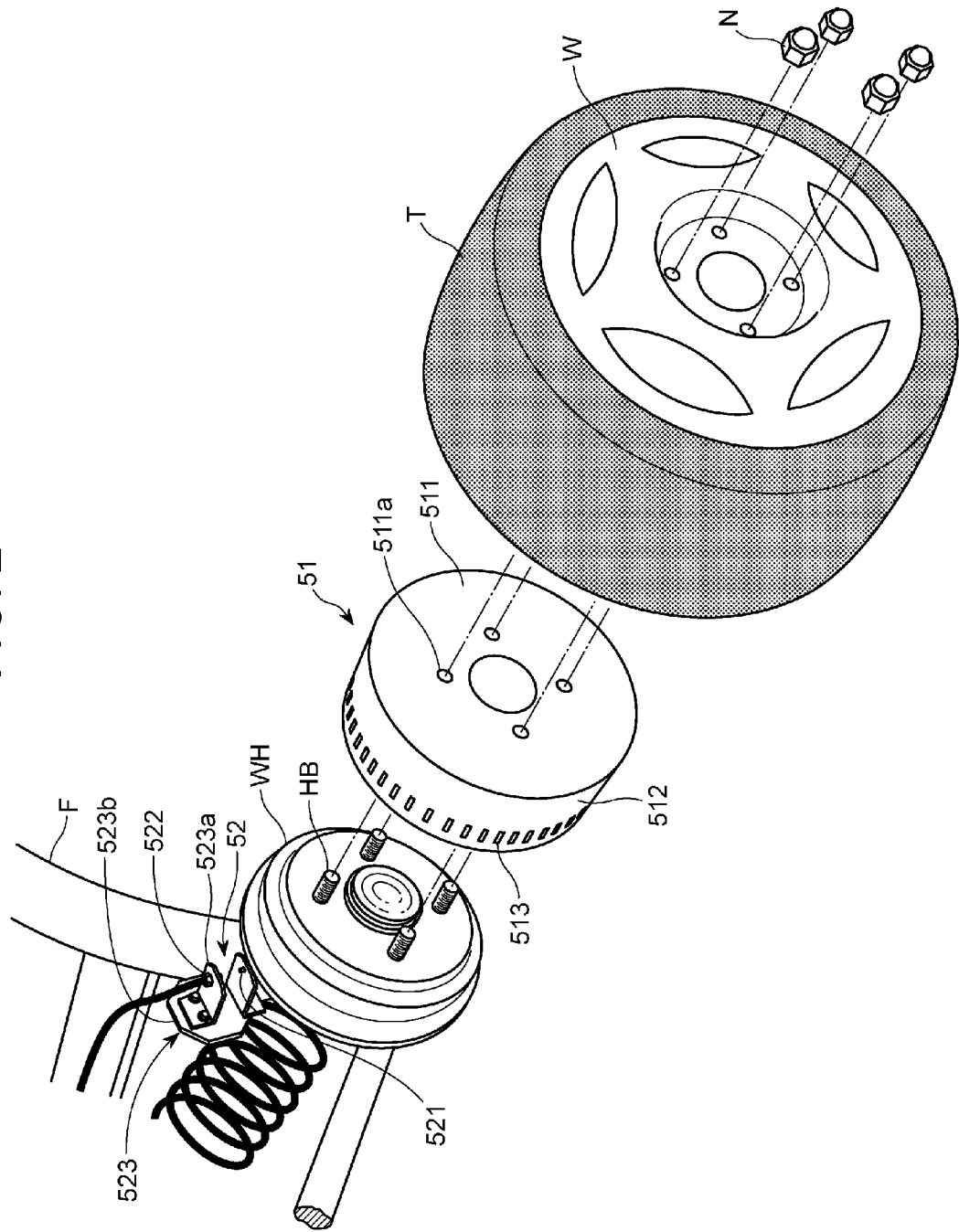
FIG. 2 is an exploded perspective view of a measuring apparatus used in the measuring system shown in FIG. 1.

The probe car P is traveling, by which the tire T rotates, and at the same time, the rotating body 51 rotates, as shown in FIG. 2. The rotating body 51 rotates, by which the long holes 513 provided along the circumferential surface of the cylindrical portion 512 pass between the light-emitting element 521 and the light-receiving element 522 of the optical detector 52.

When each of the long holes 513 is located between the light-emitting element 521 and the light-receiving element 522, light from the light-emitting element 521 reaches the light-receiving element 522, and in portions other than the long holes 513, the light is blocked off, and thus, the signal outputted from the optical detector 52 of the measuring device 5 is the sensing signal that varies in state when each of the long holes 513 is located between the light-emitting element 521 and the light-receiving element 522. This sensing signal is outputted to the data-collection processing device 6.

The data-collection processing device 6 receives the position data from the positioning device 2, the photographed data from the video camera 3, the angle data from the angle sensor 4, and the sensing signals from the measuring devices 5 arranged in the right and left rear wheels.

The traveling-distance calculating means 631 counts the sensing signals from the measuring devices 5,5 to output as the count data. That is, the count data is a cumulative value indicating how many times the long holes 513 of the rotating body 51 have passed through the optical detector 52 since the measurement started.

The data storage means 632 stores, in the storage means 62, the count data, the position data and the angle data for each frame of the photographed data in association with one another.

Figure 4:
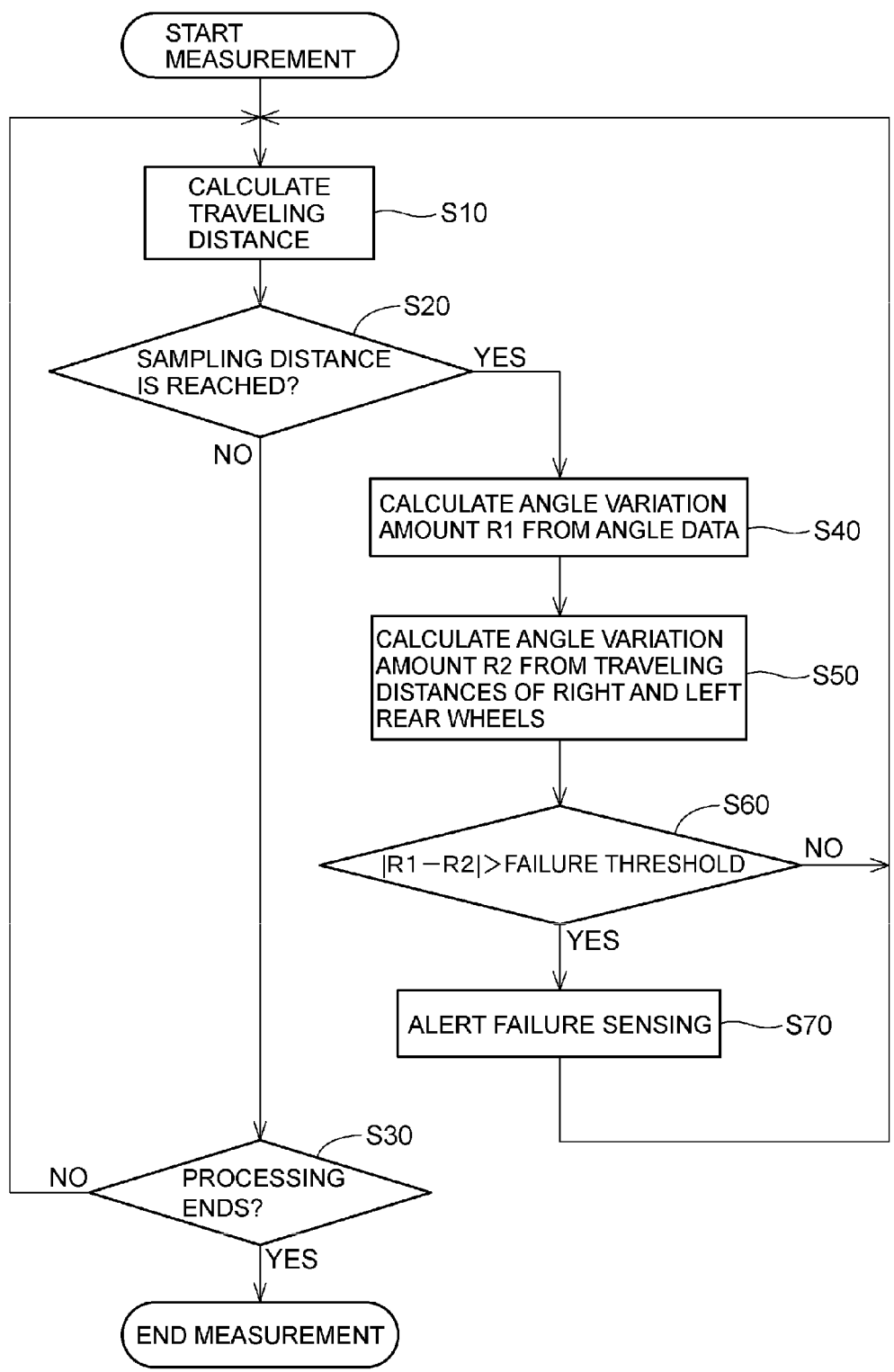
FIG. 4 is a flowchart for explaining a traveling-state determining method.
Figure 5:
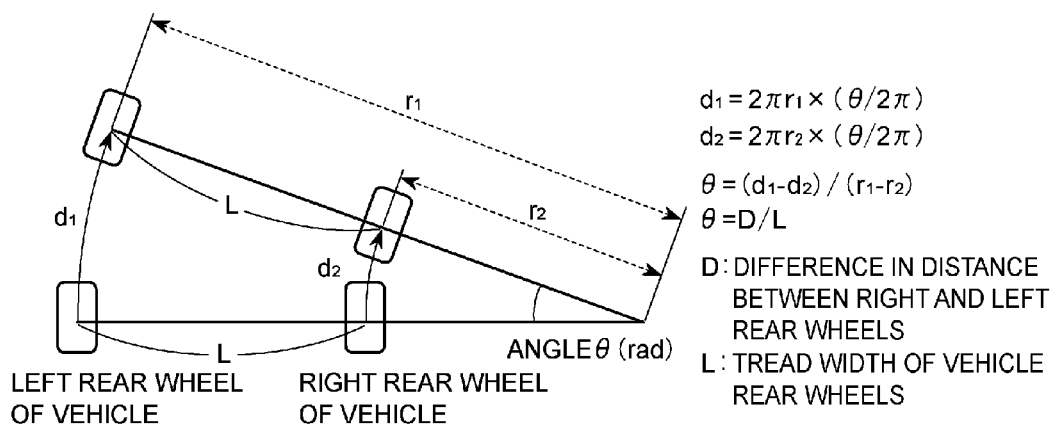
FIG. 5 is a view for explaining a calculation method of an angle variation amount.

A determination method of the traveling state that the traveling-state determining means 635 of the data processing means 63 determines is described below with reference to FIGS. 4 and 5.

The traveling-distance calculating means 631 calculates the traveling distance from the reference point to the current point based on the count data (step S10). This traveling distance can be calculated by multiplying, by the circumference data indicating the length of the circumference of the tire T, a value obtained by subtracting the count data at the reference point from the count data at the current point. In the present embodiment, since the long holes 513 are provided at the intervals of 15 degrees in the circumferential surface of the cylindrical portion 512, a length of a circumference of the tire T equivalent to 15 degrees (1/24 length) is used as the circumference data. That is, from the reference point to the current point, the traveling-distance calculating means 631 calculates the traveling distance by multiplying the number of times that the long holes 513 of the rotating body 51 pass through the optical detector 52, by the circumference data of the tire T equivalent to the interval at which the long holes 513 are provided. Immediately after the measurement starts, since the reference point is same as the traveling start point, the count data at the referent point is "0". Accordingly, when the reference point is same as the traveling start point, a value obtained by multiplying the count data at the current point by the circumference data is the traveling distance. The traveling-distance calculating means 631 calculates the traveling distances for the respective measuring devices 5 provided in the right and left rear wheels.

The traveling-distance calculating means 631 determines whether or not the calculated traveling distance has reached a distance set in advance (sampling distance) (step S20). If it is determined that the sampling distance has not been reached as a result of the determination, it is determined whether or not the processing ends (step S30). If the processing has not ended, the calculation of the traveling distance is repeated.

If it is determined that the sampling distance is reached, the angle-variation amount calculating means 634 finds the difference between the angle data at the reference point and the angle data at the current point to thereby calculate an angle variation amount R1 (step S40). Moreover, the angle-variation amount estimating means 633 estimates the angle variation amount from the difference of the distance data between the right and left wheels (step S50). As shown in FIG. 5, when the variation in traveling distance is minute, between an angle θ which is the angle variation amount and a difference of the distance data between the right and left rear wheels D=(d1−d2), a relationship of the angle θ=the difference in traveling distance D/a vehicle tread width L is established. The angle-variation estimating means 633 calculates the angle θ from the foregoing equation to estimate an angle-variation amount R2.

The traveling-state determining means 635 determines whether or not an absolute value of a difference between the angle variation amount R1 calculated by the angle-variation amount calculating means 634 and the angle variation amount R2 estimated by the angle-variation amount estimating means 633 is larger than a failure threshold set in advance (step S60).

If the absolute value of the difference in angle variation amount is larger than the failure value, it is determined that there is abnormity in any one of the angle sensor 4, the measuring devices 5, and the cables connecting these to the data-collection processing device 6, and the measurer is informed of the abnormity by the informing means 64 (step S70).

If the absolute value of the difference in angle variation amount is not larger than the failure threshold, the measurement is continued with the current point used as the reference point.

Using the traveling distance and the angle variation amount calculated in this manner, the position where the vehicle is traveling is calculated based on the position information of the reference point. The position information is associated with the photographed data acquired by the video camera 3. The collected traveling trace data is utilized for creation of an electronic map, a map book and the like.

As described above, according to the measuring device 5 of the embodiment of the present invention, since the rotating body 51 is arranged between the wheel W supporting the tire T and the wheel hub WH for mounting this wheel W on the body frame F of the vehicle with the rotation centers aligned with each other, the measuring device 5 does not bulge outward from the wheel. Accordingly, attaching the measuring device 5 to the probe car P does not largely increase the vehicle width. Moreover, since the optical detector 52 that detects the variation in position of the long holes 513 accompanying the rotation of the rotating body 51 is fixed to the body frame F, even if the rotating body 51 swings in accordance with the bumps of the road surface, the optical detector 52 also swings accompanying the rotating body 51, and thus, the measurement can be performed without any influence even if a shock absorber is arranged obliquely to the body frame F. Consequently, the measurement is enabled also on a narrow path as far as the probe car P can enter, and highly accurate measurement is enabled even if the road surface has bumps.

Moreover, the optical detector 52 detects the long holes 513 of the cylindrical portion 512 extending from the disk portion 511 mounted on the mounting surface of the wheel hub WH to the body frame F and encompassing the outer circumferential surface of the wheel hub WH, so that the optical detector 52 can be set up at a position with a short distance from the body frame F. For example, if the rotating body 51 is only made of a large disk portion and the long holes 513 are provided along a circumferential direction of the disk portion, a length of the mounting bracket for attaching the optical detector 52 to the body frame F needs to be not less than a distance from the body frame F to the mounting surface of the wheel hub WH. This makes the mounting bracket largely shake due to vibration, and as a result, there arises a possibility that a measurement error occurs or that the wheel W is hit by the mounting bracket.

In the rotating body 51 according to the present embodiment, since the cylindrical portion 512 extends from the disk portion 511 to the body frame F and encompasses the outer circumferential surface of the wheel hub WH, the optical detector 52 can be set up at a position with a short distance from the body frame F. Accordingly, since the mounting bracket 523 for supporting the optical detector 52 may not be a member having a long length, a situation can be prevented in which a measurement error occurs or the optical detector 52 hits the rotating body 51 due to the optical detector 52 largely swinging by vibration.

Moreover, since the rotating body 51 is attached between the wheel W and the wheel hub WH, it can be easily attached to the probe car P. Accordingly, as compared with a case where a rotary encoder or the like is mounted on the wheel shaft for rotating the wheel hub WH, the attachment work is facilitated, which enables the attachment without high knowledge of the vehicle.

Moreover, since the rotating body 51 and the light-emitting element 521 as well as the light-receiving element 522 make up the rotary encoder adopting the transmissive photo interrupter which optically senses the rotation, reduced is the case of detection of the vibration of the probe car P as the rotation of the rotating body 51. Accordingly, the measuring devices 5 can perform more accurate measurement.

Moreover, according to the measurement system 1 in the embodiment of the present invention, since the measuring devices 5 can be arranged in the respective right and left rear wheels of the probe car P without bulging outward from the probe car P, the provision of the measuring devices 5 in both of the wheels does not largely increase the vehicle width. Moreover, the traveling-distance calculating means 631 counts the sensing signals outputted from the optical detector 52 and multiplies the counted number of times by the circumference data of the tire T equivalent to one time to calculate the traveling distance, and the angle-variation amount estimating means 633 estimates the angle variation amount in the traveling direction of the probe car P based on the difference in traveling distance between the right and left tires T and the distance between the right and left tires T. Therefore, it is possible to obtain the data in which the traveling distances of the tires T and the variation in the traveling direction in accordance with the distances match each other. Accordingly, the measuring system 1 can accurately obtain the traveling trace of the probe car P.

Furthermore, the traveling-state determining means 635 compares the angle variation amount calculated by the angle sensor 4 and the angle-variation amount calculating means 634 with the angle variation amount estimated by the angle-variation amount estimating means 633. When these variation amounts are largely different, it can be detected that the measurement state is abnormal. Accordingly, the traveling state of the probe car P can be determined.

While the embodiment of the present invention has been described in the foregoing, the present invention is not limited to the above-described embodiment. For example, in the present embodiment, the plurality of long holes 513 are provided as the optically sensed portions, there may be provided only one long hole 513. However, since high accuracy can be ensured by the long hole 513 passing at relatively short time intervals, it is desirable that the plurality of long holes 513 are provided at regular intervals.

Figure 6:
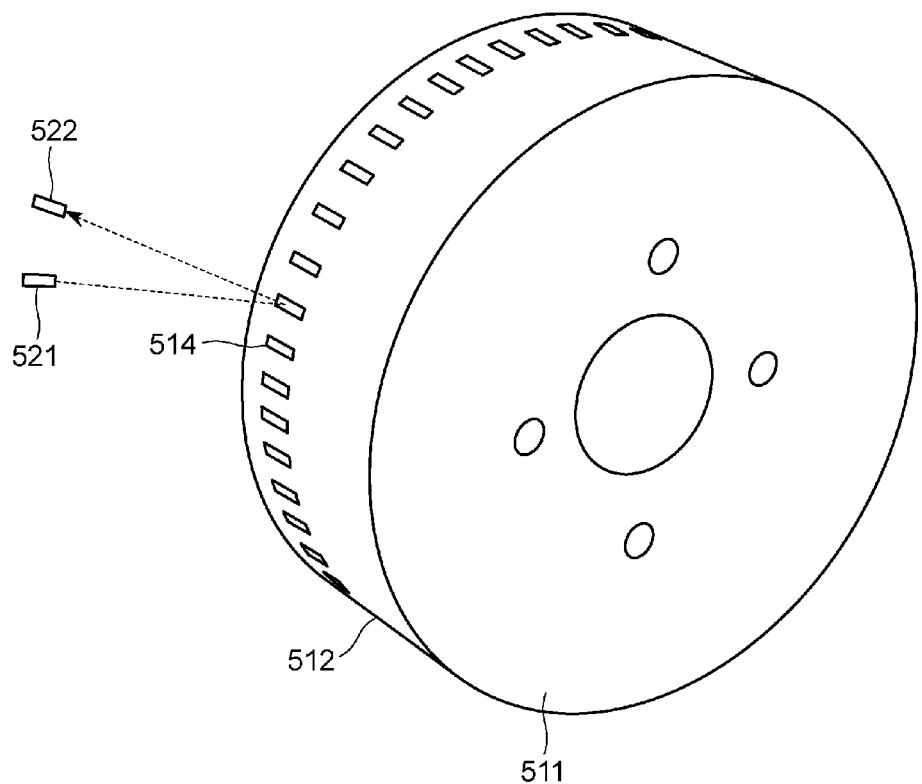
FIG. 6 is a view showing a rotating body including reflecting portions as optically sensed portions and an optical detector.

Moreover, in place of the long holes 513 serving as the light-transmitting portions, reflecting portions 514 (refer to FIG. 6) can be provided in the cylindrical portion 512 as the optically sensed portions. In this case, the light-receiving element 522 is arranged at a position where it can receive the light from the light-emitting element 521 reflected by the reflecting portions 514. The reflecting portions 514 can be mirrors, metal plates each having a reflecting surface by metal luster, or the like.

Furthermore, in the present embodiment, while the measuring device 5 is utilized for the measurement of the traveling distance, the measuring device 5 can be utilized for the measurement of the traveling speed by calculating the number of the sensing signals outputted from the measuring device 5 per time.

Since the measuring apparatus of the present invention and the measuring system using the same can obtain an accurate traveling trace, they are optimal for production of an electronic map, a map book and the like.

While the present invention has been described in connection with certain exemplary embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

FIG. 1
(1) PROBE CAR P
(2) TRAVELING DIRECTION
(3) FRONT WHEEL
(4) REAR WHEEL
2. POSITIONING DEVICE
3. VIDEO CAMERA
4. ANGLE SENSOR
5. MEASURING DEVICE
6. DATA-COLLECTION PROCESSING DEVICE
FIG. 3
POSITIONING DEVICE 2
VIDEO CAMERA 3
ANGLE SENSOR 4
MEASURING DEVICE 5
6. DATA PROCESSING DEVICE
61. INPUT INTERFACE MEANS
62. STORAGE MEANS
63. DATA PROCESSING MEANS
631. TRAVELING-DISTANCE CALCULATING MEANS
632. DATA STORAGE MEANS
633. ANGLE-VARIATION AMOUNT ESTIMATING MEANS
634. ANGLE-VARIATION AMOUNT CALCULATING MEANS
635. TRAVELING-STATE DETERMINING MEANS
64. INFORMING MEANS
(1) TRAVELING TRACE DATA
(2) PHOTOGRAPHED DATA
(3) ANGLE DATA
(4) COUNT DATA
(5) POSITION DATA
(6) LONGITUDE DATA/LATITUDE DATA
(7) FRAME
FIG. 4
(1) START MEASUREMENT
S10. CALCULATE TRAVELING DISTANCE
S20. SAMPLING DISTANCE IS REACHED?
(2) YES
(3) NO

S40. CALCULATE ANGLE VARIATION AMOUNT R1 FROM ANGLE DATA
S50. CALCULATE ANGLE VARIATION AMOUNT R2 FROM TRAVELING DISTANCES OF RIGHT AND LEFT REAR WHEELS
S60. |R1−R2|>FAILURE THRESHOLD
S70. ALERT FAILURE SENSING
S30. PROCESSING ENDS?
(4) END MEASUREMENT
FIG. 5
(1) LEFT REAR WHEEL OF VEHICLE
(2) RIGHT REAR WHEEL OF VEHICLE
(3) ANGLE θ (rad))
(4) D: DIFFERENCE IN DISTANCE BETWEEN RIGHT AND LEFT REAR WHEELS
L: TREAD WIDTH OF VEHICLE REAR WHEELS

The invention claimed is:

1. A measuring apparatus comprising:
a rotating body that is provided with an optically sensed portion, and is arranged between a wheel for supporting a tire and a wheel hub for mounting the wheel on a body frame of a vehicle with rotation centers aligned with each other; and
an optical detector that is fixed to the body frame, and detects variation in position of the optically sensed portion accompanying rotation of the rotating body,
wherein
the rotating body is formed of a disk portion attached between the wheel and a mounting surface of the wheel hub, and a cylindrical portion that extends from the disk portion to the body frame and encompasses an outer circumferential surface of the wheel hub,
the optically sensed portion is provided along a circumferential surface of the cylindrical portion, and
the optical detector is mounted on the body frame via a mounting bracket.

2. The measuring apparatus according to claim 1, wherein
the optically sensed portion is a light-transmitting portion that transmits light, and
the optical detector is made of a light-emitting portion that emits light toward the light-transmitting portion, and a light-receiving portion that receives the transmitted light passing through the light-transmitting portion, which are opposed to each other with the light-transmitting portion interposed therebetween.

3. The measuring apparatus according to claim 1, wherein
the optically sensed portion is a light-reflecting portion that reflects light, and
the optical detector is made of a light-emitting portion that emits light toward the light-reflecting portion, and a light-receiving portion that receives the reflected light from the light-reflecting portion.

4. A measuring system comprising:
a measuring apparatus according to claim 1 arranged in each of right and left wheels of at least any one of front wheels and rear wheels of the vehicle;
traveling-distance calculating means for calculating a traveling distance of each of the tires, based on a sensing signal outputted from the optical detector and circumference data of the tire; and
angle-variation amount estimating means for estimating an angle variation amount in a traveling direction of the vehicle, based on a difference in the traveling distances of the right and left tires, and a distance between the right and left tires.

5. The measuring system according to claim 4, comprising:
angle detecting means for detecting angle variation in the traveling direction of the vehicle to output as angle data;
angle-variation amount calculating means for calculating an angle variation amount based on the angle data; and
traveling-state determining means for comparing the angle variation amount calculated by the angle-variation amount calculating means with the angle variation amount estimated by the angle-variation amount estimating means to determine a traveling state of the vehicle.

6. The measuring system according to claim 4, wherein
the optically sensed portion is a light-transmitting portion that transmits light, and
the optical detector is made of a light-emitting portion that emits light toward the light-transmitting portion, and a light-receiving portion that receives the transmitted light passing through the light-transmitting portion, which are opposed to each other with the light-transmitting portion interposed therebetween.

7. The measuring system according to claim 4, wherein
the optically sensed portion is a light-reflecting portion that reflects light, and
the optical detector is made of a light-emitting portion that emits light toward the light-reflecting portion, and a light-receiving portion that receives the reflected light from the light-reflecting portion.

8. The measuring system according to claim 4, wherein
a plurality of the optically sensed portion is provided along the circumferential surface of the cylindrical portion such that they are equally spaced away from adjacent ones.

9. A probe car including therein a measuring system defined in claim 4.

10. The measuring apparatus according to claim 1, wherein a plurality of the optically sensed portion is provided along the circumferential surface of the cylindrical portion such that they are equally spaced away from adjacent ones.

* * * * *